(12) United States Patent
Whittaker et al.

(10) Patent No.: US 12,149,414 B2
(45) Date of Patent: *Nov. 19, 2024

(54) GENERATING AND UTILIZING TEMPLATES AND LOGICAL PATHS TO DEPLOY NETWORK EQUIPMENT

(71) Applicant: AT&T Intellectual Property I, L.P., Atlanta, GA (US)

(72) Inventors: Allison Whittaker, Alpharetta, GA (US); Jeff Johnson, Helotes, TX (US); Jayant V Ragde, Duluth, GA (US); Abdelmajid Belhareth, Lawrenceville, GA (US); Keith Dorking, Peachtree Corners, GA (US); Mohammad Nikain, Atlanta, GA (US); Vahid Tavassoli, Alpharetta, GA (US); Jiyuan Wang, Cumming, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,142

(22) Filed: Apr. 20, 2023

(65) Prior Publication Data
US 2024/0056360 A1 Feb. 15, 2024

Related U.S. Application Data

(63) Continuation of application No. 17/675,868, filed on Feb. 18, 2022, now Pat. No. 11,646,946, which is a (Continued)

(51) Int. Cl.
*G06F 15/173* (2006.01)
*H04L 41/0806* (2022.01)
(Continued)

(52) U.S. Cl.
CPC .......... *H04L 41/14* (2013.01); *H04L 41/0806* (2013.01); *H04L 41/12* (2013.01); *H04L 41/5041* (2013.01)

(58) Field of Classification Search
CPC ................................ H04L 41/14; H04L 41/12
See application file for complete search history.

(56) References Cited

U.S. PATENT DOCUMENTS 11,271,819 B1 * 3/2022 Whittaker ............... H04L 41/14
11,729,055 B1 * 8/2023 Belhareth ........... H04L 41/0806
709/220

(Continued)

OTHER PUBLICATIONS

Notice of Allowance dated Nov. 2, 2021 for U.S. Appl. No. 17/349,239, 36 pages.

(Continued)

*Primary Examiner* — Padma Mundur
(74) *Attorney, Agent, or Firm* — Guntin & Gust, PLC; Matthew Tropper

(57) ABSTRACT

The technologies described herein are generally directed to deploying network equipment. For example, a method described herein can include facilitating receiving a first request to deploy first network equipment at a deployment location, with the first request including a first deployment parameter for the first network equipment. The method further includes, based on the first network equipment and the first deployment parameter, generating a deployment template. Further, the method can facilitate receiving a second request to deploy second network equipment at the deployment location, with the second request including a second deployment parameter for the second network equipment. The method can further include, based on the deployment template and the second deployment parameter, deploying the second network equipment.

20 Claims, 10 Drawing Sheets

Related U.S. Application Data continuation of application No. 17/349,239, filed on Jun. 16, 2021, now Pat. No. 11,271,819.

(51) Int. Cl.
*H04L 41/12* (2022.01)
*H04L 41/14* (2022.01)
*H04L 41/5041* (2022.01)

(56) References Cited

U.S. PATENT DOCUMENTS

| | | | | |
|---|---|---|---|---|
| 2014/0337830 | A1* | 11/2014 | Schwaninger | G06F 8/61 717/177 |
| 2015/0365282 | A1* | 12/2015 | Nishath | H04L 41/0843 709/221 |
| 2020/0228419 | A1* | 7/2020 | Xu | H04L 41/50 |
| 2020/0229080 | A1* | 7/2020 | Xu | H04W 12/00 |
| 2020/0356402 | A1* | 11/2020 | Zhang | G06F 9/5077 |
| 2021/0034260 | A1* | 2/2021 | Lyon | G06F 3/0629 |
| 2021/0314361 | A1* | 10/2021 | Zhou | H04L 41/18 |
| 2022/0407782 | A1 | 2/2022 | Whittaker et al. | |

OTHER PUBLICATIONS

Office Action mailed Aug. 26, 2022 for U.S. Appl. No. 17/675,868, 25 pages.

Notice of Allowance mailed Dec. 28, 2022 for U.S. Appl. No. 17/675,868, 26 pages.

Notice of Allowance dated Mar. 30, 2023 for U.S. Appl. No. 17/981,254, 28 pages.

* cited by examiner

GENERATING AND UTILIZING TEMPLATES AND LOGICAL PATHS TO DEPLOY NETWORK EQUIPMENT

RELATED APPLICATIONS

The subject patent application is a continuation of, and claims priority to each of, U.S. patent application Ser. No. 17/675,868, filed Feb. 18, 2022, and entitled "GENERATING AND UTILIZING TEMPLATES AND LOGICAL PATHS TO DEPLOY NETWORK EQUIPMENT," which is a continuation of U.S. patent application Ser. No. 17/349,239 (now U.S. Pat. No. 11,271,819), filed Jun. 16, 2021, and entitled "GENERATING AND UTILIZING TEMPLATES AND LOGICAL PATHS TO DEPLOY NETWORK EQUIPMENT," the entireties of which priority applications are hereby incorporated by reference herein.

TECHNICAL FIELD

The subject application is related to the implementation of networked computer systems and, for example, different approaches to deploying and configuring computer systems.

BACKGROUND

As network implementations have continued to increase in complexity and diversity, problems can occur during the planning of such systems and the allocation of computing resources. In telecommunications networks, large inventories of network equipment, complex deployments, and different processes are handled by existing isolated and difficult to modify legacy systems. In some circumstances, requirements of certain networks cause large numbers of similar network equipment to be deployed and configured.

These problems are enhanced by the transition to next generation communications systems. Legacy systems often cannot be easily modified to incorporate significant changes to the requirements of different network services.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
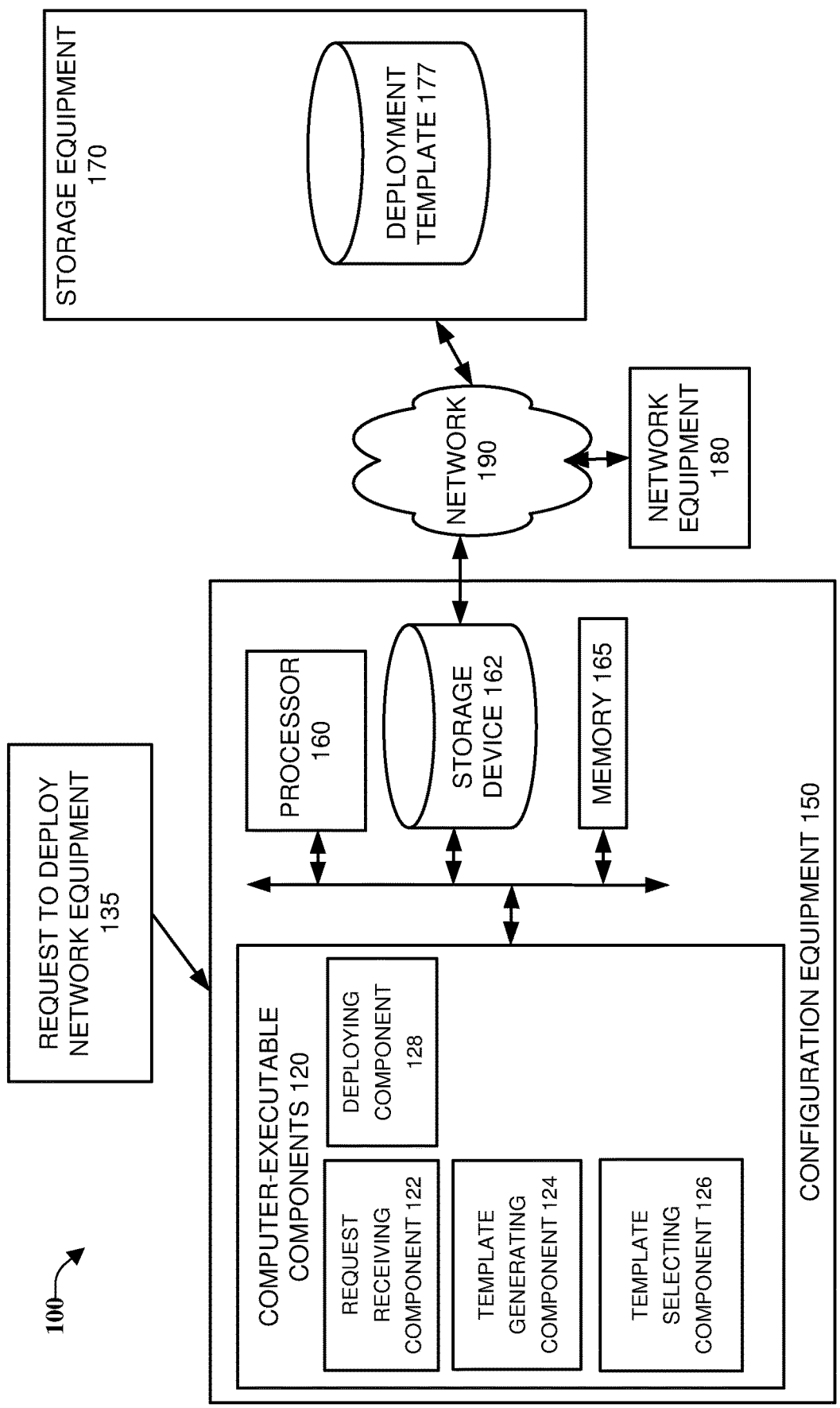
FIG. 1 is an architecture diagram of an example system that can facilitate generating and utilizing templates to deploy network equipment, in accordance with one or more embodiments.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate generating and utilizing templates to deploy service equipment networks. Different examples that describe these aspects are included with the description of FIGS. 1-10 below. It should be noted that the subject disclosure may be embodied in many different forms and should not be construed as limited to this example or other examples set forth herein.

In at least one implementation, one or more embodiments can be used to facilitate the implementation of parts of a large-scale communications network. Example embodiments can include, but are not limited to, communication networks that span various geographic areas and serve wireless and fiber-broadband customers. According to a wireless implementation, one or more communication service provider networks can be, or include, the wireless communication network and/or various additional devices and components of the wireless communication network (e.g., additional network devices and cell, additional user equipment, network server devices, etc.). One or more embodiments can facilitate the placement of multiple antennas in a geographic area enabling coverage by networks that include, but are not limited to, communication service provider networks. In exemplary, non-limiting embodiments described herein, simulated groups of antennas can include millimeter wave (mmWave) antennas of a base station of a cellular network, e.g., a fifth generation or other next generation RAN. In certain implementations of types of mmWave antennas, large numbers of antennas are deployed in comparison with the number of other types of antennas that can be employed, e.g., up to and exceeding in some circumstances, one hundred antennas per square mile.

In some embodiments the non-limiting terms "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., generating and maintaining templates with logical and physical models of complex hardware and software configurations), that are not abstract and cannot be performed as a set of mental acts by a human. For example, a human, or even a plurality of humans, cannot efficiently deploy and configure network equipment in accordance with logical and physical models, with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate generating and utilizing templates to deploy service equipment networks. It should be noted that the subject disclosure may be embodied in many different forms and should not be construed as limited to this example or other examples set forth herein. The above-described background relating to network hardware is merely intended to provide a contextual overview of the elements of one or more embodiments, and is not intended to be exhaustive.

As discussed further below, one or more embodiments can address problems such as those described in the Background section above with inventive concepts that include different approaches to generating and utilizing templates and logical connection paths to deploy network equipment FIG. 1 is an architecture diagram of an example system 100 that can facilitate generating and utilizing templates to deploy network equipment, in accordance with one or more embodiments. For purposes of brevity, description of like elements and/or processes employed in other embodiments is omitted.

As depicted, system 100 can include configuration equipment 150 that receives request to deploy network equipment 135, and is communicatively coupled to network equipment 180 and storage equipment 170 via network 190. In one or more embodiments, configuration equipment 150 can include computer executable components 120, processor 160, storage device 162, and memory 165. Storage equipment 170 can include deployment template 177. Computer executable components 120 can include request receiving component 122, template generating component 124, template selecting component 126, deploying component 128, and other components described or suggested by different embodiments described herein that can improve the operation of system 100. It is noted that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, configuration equipment 150 can further comprise various computer and/or computing-based elements described herein with reference to operating environment 1000 and FIG. 10.

According to multiple embodiments, network 190 can comprise, but is not limited to, wired and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

According to multiple embodiments, configuration equipment 150 can include memory 165. In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

In some embodiments, memory 165 can store one or more computer and/or machine readable, writable, and/or executable components and/or instructions 120 that, when respectively executed by processor 160, can facilitate performance of operations defined by the executable component(s) and/or instruction(s). Generally, applications (e.g., computer executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

In one or more embodiments, computer executable components 120 can be used in connection with implementing one or more of the systems, devices, components, and/or computer-implemented operations shown and described in connection with FIG. 1 and other figures disclosed herein. For example, in one or more embodiments, computer executable components 120 can include instructions that, when executed by processor 160, can facilitate performance of operations defining request receiving component 122. As discussed with examples of one or more embodiments below, request receiving component 122 can, in accordance with one or more embodiments, facilitate receiving a first request to deploy first network equipment at a deployment location, with the first request including a first deployment parameter for the first network equipment.

In another example, in one or more embodiments, computer executable components 120 can include instructions that, when executed by processor 160, can facilitate performance of operations defining template generating component 124. As discussed with FIG. 2 below, template generating component 124 can, in accordance with one or more embodiments, can, based on the first network equipment and the first deployment parameter, generate, by the configuration equipment, deployment template 177.

One having skill in the relevant art(s), given the description herein, will appreciate the network equipment and network equipment projects that can benefit from implementation using approaches described herein. As used with some examples herein, network equipment can include different resources (e.g., computing resources) that can perform functions in furtherance of the services described herein.

Generally speaking, as described herein, deployment template 177 can access a logical inventory model that can provide a data and process model to support telecom services and inventory, including network topologies. In one or more embodiments, deployment template 177 can provide common interfaces to support various network domains and manage relationships among data objects and associated information. For example, deployment template 177 can facilitate, in a structured and predictable manner, identifying and utilizing particular telecom data for deploying network equipment and connections. Of further benefit, because deployment template 177 describes telecom equipment and services, models described herein can align with telecom industry standards, including but not limited to Telemanagement Forum (TMF), Internet Engineering Task Force (IETF), 3rd Generation Partnership Project (3GPP), Open Network Foundation Transport API (ONF TAPI), Open Network Automation Platform (ONAP), and International Telecommunications Union Telecommunication Standardization Sector (ITU-T).

In additional embodiments, computer executable components 120 can include instructions that, when executed by processor 160, can facilitate performance of operations defining template selecting component 126. As discussed below, template selecting component 126 can, in accordance with one or more embodiments, based on a similarity criterion, evaluate the second network equipment compared to characteristics of the deployment template, and based on a result of the evaluating, select deployment template 177 for the deploying of the second network equipment.

In additional embodiments, computer executable components 120 can include instructions that, when executed by processor 160, can facilitate performance of operations defining deploying component 128. As discussed with FIG. 2 below, deploying component 128 can, in accordance with one or more embodiments, based on deployment template 177 and the second deployment parameter, deploy the second network equipment and specified by deployment template 177.

It is noted that the embodiments of the subject disclosure depicted in various figures disclosed herein are for illustration only, and as such, the architecture of such embodiments are not limited to the systems, devices, and/or components depicted therein. For example, in some embodiments, configuration equipment 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
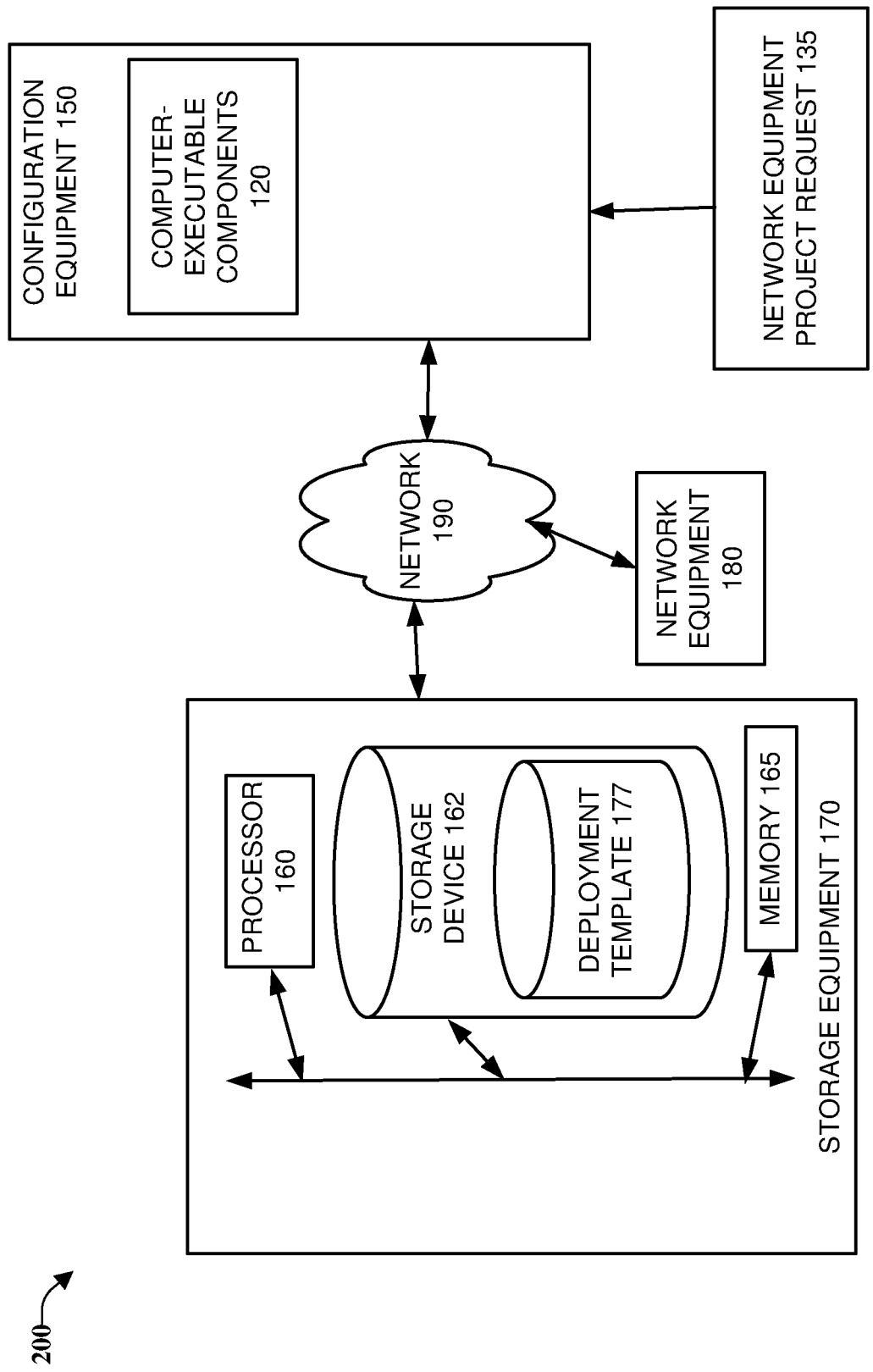
FIG. 2 is a diagram of a non-limiting example system that can facilitate generating and utilizing templates to deploy network equipment, in accordance with one or more embodiments.

FIG. 2 is a diagram of a non-limiting example system 200 that illustrates the use of storage equipment to select and provide templates to deploy network equipment, in accordance with one or more embodiments. For purposes of brevity, description of like elements and/or processes employed in other embodiments is omitted.

As depicted, system 200 can include configuration equipment 150 that receives request to deploy network equipment 135, and is communicatively coupled to network equipment 180 and storage equipment 170 via network 190. In one or more embodiments, configuration equipment 150 can include computer executable components 120. In one or more embodiments, storage equipment 170 can include processor 160, storage device 162, and memory 165. Storage equipment 170 can include deployment template 177.

Figure 3:
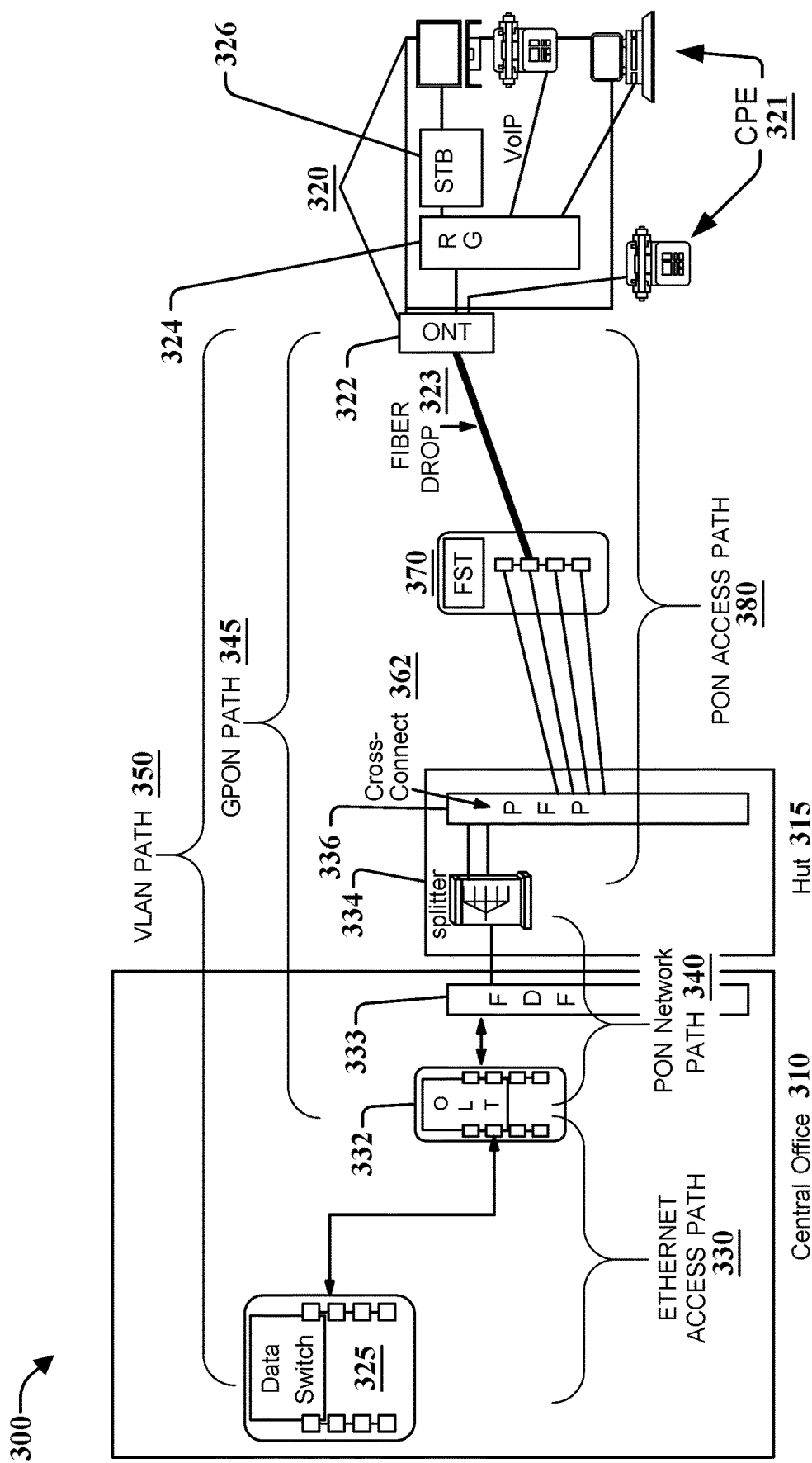
FIG. 3 is a layered architectural diagram of a non-limiting example system that can facilitate generating and utilizing templates to deploy network equipment, in accordance with one or more embodiments.

In an example implementation discussed further with FIG. 3, network equipment project request can include a request to establish Internet connectivity for a customer. In this example, deployment template 177 can include data describing hardware and software elements associated with a variety of different requests, as well as business rules and processes for deploying and configuring required elements, e.g., business rules and processes for resource reservation and assignments, e.g., IP addresses, Virtual LANS (VLANS), interfaces used, ports allocated, etc. In one approach to responding to the request to deploy network equipment 135 for the Internet connectivity, template generating component 124 can use the request to, based on the first network equipment and the first deployment parameter, generate, by the configuration equipment, deployment template 177.

Deploying component 128 can be used to reserve and configure network equipment for the response. To this end, a non-limiting characteristic of one or more embodiments is the specific configuration of embodiments to communicate according to a network communication protocol associated with a fifth generation communication network or a next generation communication network defined subsequent to the fifth generation communication network, e.g., a sixth generation network communication protocol associated with a sixth generation communication network.

In additional embodiments, template selecting component 126 can further, based on a similarity criterion, evaluate the second network equipment compared to characteristics of deployment template 177 and based on a result of the evaluating, select deployment template 177 for the deploying of the second network equipment. In additional or alternate embodiments, deployment template 177 can include a lifecycle characteristic, and the deploying the second network equipment can further be based on the lifecycle characteristic and lifecycle status of the second network equipment.

As discussed with FIG. 3 below, in another embodiment, deployment template 177 can further include a logical resource path that describes a link between the first network equipment and other network equipment. In one or more embodiments, deploying the second network equipment based on deployment template 177 can include deploying the link between the first network equipment and the second network equipment based on the logical resource path. In one or more embodiments, deploying the link based on the logical resource path can include transforming the logical resource path into a physical resource path, and deploying the link based on the physical resource path.

FIG. 3 is a layered architectural diagram of a non-limiting example system 300 that can facilitate generating and utilizing templates to deploy network equipment in a fiber-broadband network, in accordance with one or more embodiments. For purposes of brevity, description of like elements and/or processes employed in other embodiments is omitted. For purposes of brevity, description of like elements and/or processes employed in other embodiments is omitted.

As depicted, system 300 can include central office 310, hut 315, and customer premises 320. Central office 310 utilizes components that include, but are not limited to, data switch 325 connected to optical line terminal (OLT) 332 via ethernet access path 330. Central office 310 is connected to hut 315 by passive optical network (PON) network path 340, via fiber distribution frame (FDF) 333 coupled to splitter 334 of hut 315. Hut 315 is coupled to customer premises 320 by PON access path 380, e.g., enabled via primary flexibility point (PFP) 336 connected via fiber service terminal (FST) 370 to optical network terminal (ONT) 322 of customer premises 320. Virtual local area network (VLAN) path 350 labels a logical connection between data switch 325 of central office 310 and ONT 322 of customer premises 320, gigabit passive optical network (GPON) path 345 labeling a logical connection between OLT 332 of central office 310 and ONT 322 of customer premises 320, and PON access plan 380 labels a logical connection between splitter 334 and OLT 332. Customer premises 320 includes a connection between ONT 322 and residential gateway (RG) 324 connected to set top box (STB) 326. In an example implementation, customer premises equipment (CPE) 321 is variously connected to ONT 322. It will be appreciated that different example elements of system 300 are specific to a fiber-broadband implementation, but that this example is non-limiting, and one or more approaches described with FIG. 3 can apply to other components of similar function, for a wireless network.

As discussed herein, the logical connections described above (e.g., VLAN path 350, GPON path 345, PON access path 380, and PON network path 340) can be termed circuits between two end points. In one or more embodiments, in a carrier network, there can be many levels of connections with complex inter-relationships. System 300 illustrates an example of such a combination of circuits that can provide the connectivity between central office 310 (e.g., the Internet) and CPE 321 of customer premises 320. It should be noted that, in addition to the example depicted in and discussed with FIG. 3 herein, one or more embodiments can be used to automate and standardize other high-volume and/or complex network designs, including, but not limited to broadband fulfillment, and IP VPN fulfillment.

Generally speaking, one or more embodiments can deploy the example illustrate by system 300 by, for example, automatically selecting, provisioning, configuring and deploying the components that enable the logical connections, e.g., as depicted logical connection VLAN path 350 utilizes data switch 325, OLT 332, FDF 333, splitter 334, PFP 336, FST 370, and ONT 322. One having skill in the relevant art(s), given the depicted elements of system 300, and the descriptions and examples of the present disclosure, will appreciate the combinations of depicted components which make of the other logical connections described above. It should be noted that, in one or more embodiments, the complex setup of components depicted in FIG. 3 can be both automatically setup and automatically dismantled, even when different technologies require different levels and components.

Returning to VLAN path 350, in this example, this circuit can provide a connection to the Internet (e.g., via central office 310) for RG 324. In an example implementation, one or more embodiments can, upon selection of the task to be performed (e.g., connect a particular customer premises 320 to the Internet), a circuit template can be identified that references a combination of network equipment that can perform the task requested. For example, as depicted in FIG. 3, network equipment used to establish a connection between CP 320 and the internet, including, but not limited to, data switch 325, OLT 332, FDF 333, splitter 334, PFP 336, FST 370, fiber drop 323, ONT 322, and ONT 322. In some implementations, these components can be automatically connected, e.g., to facilitate physical connections that match the logical connections discussed above by configuring ports, IP addresses, interfaces. Further, one or more embodiments can generate and utilize business rules and processes for resource reservation and assignments for configuration of the elements that enable the broad, logical connections identified above.

In addition to utilizing templates to implement the logical connections described above, one or more embodiments can use similar approaches to validate the implementation of components, e.g., by utilizing business rules for validations and concurrency checks of network resource reservation, configuration, assignment, and deployment.

Continuing the discussion of the example of FIG. 3, as depicted, to implement the logical VLAN path 350, network equipment associated with ethernet access path 330 can be configured to provide connectivity between central office 310 fiber equipment (e.g., OLT 332) and the internet, e.g., via data switch 325. Similarly, the logical PON network path 340 can connect splitter 334 of hut 315 to OLT 332 of central office 310, e.g., PON network path 340 connections being used by one or more embodiments to, for example, facilitate the offering of fiber-optic connectivity via central office 310.

Continuing this example, in an implementation where one or more embodiments are used to further automate and standardize high-volume and complex network designs, when network access by a customer is sought to be enabled, PON access path 380 can be selected by one or more embodiments for provisioning, configuration, and implementation of implicated network equipment. For example, PON access path 380 depicts a logical connection between network equipment of hut 315 (e.g., splitter 334) and network equipment of customer premises 320, e.g., ONT 322 and RG 324. To facilitate this connection, network equipment that includes, but is not limited to splitter 334, PFP 336, FST 370, fiber drop 323, ONT 322, and RG 324 can be configured, e.g., by configuring ports, IP addresses, etc.

It should be noted that, in addition to being implemented individually by one or more embodiments, the logical connections depicted in FIG. 3 can be implemented together, e.g., in serial or parallel in order to automate more complex processes. For example, after customer premises 320 is connected to hut 315 by PON access path 380 (e.g., (connecting customer premises 320 to a fiber branch that can serve a neighborhood with basic connectivity), GPON path 345 can be triggered to provision, configure, and implement the network equipment used to further connect customer premises 320 to central office 310. Continuing this sequential process of automatic physical implementation of broad, logical circuits between endpoints, VLAN path 350 can be utilized to guide the configuration of network equipment to facilitate network equipment of customer premises 320 (e.g., RG 324) obtaining Internet connectivity by receiving an IP address from data switch 325.

It should be noted that, without the advantages provided by one or more embodiments described herein, the example processes discussed above can require manual configuration steps be performed for each instance of the connections.

Figure 4:
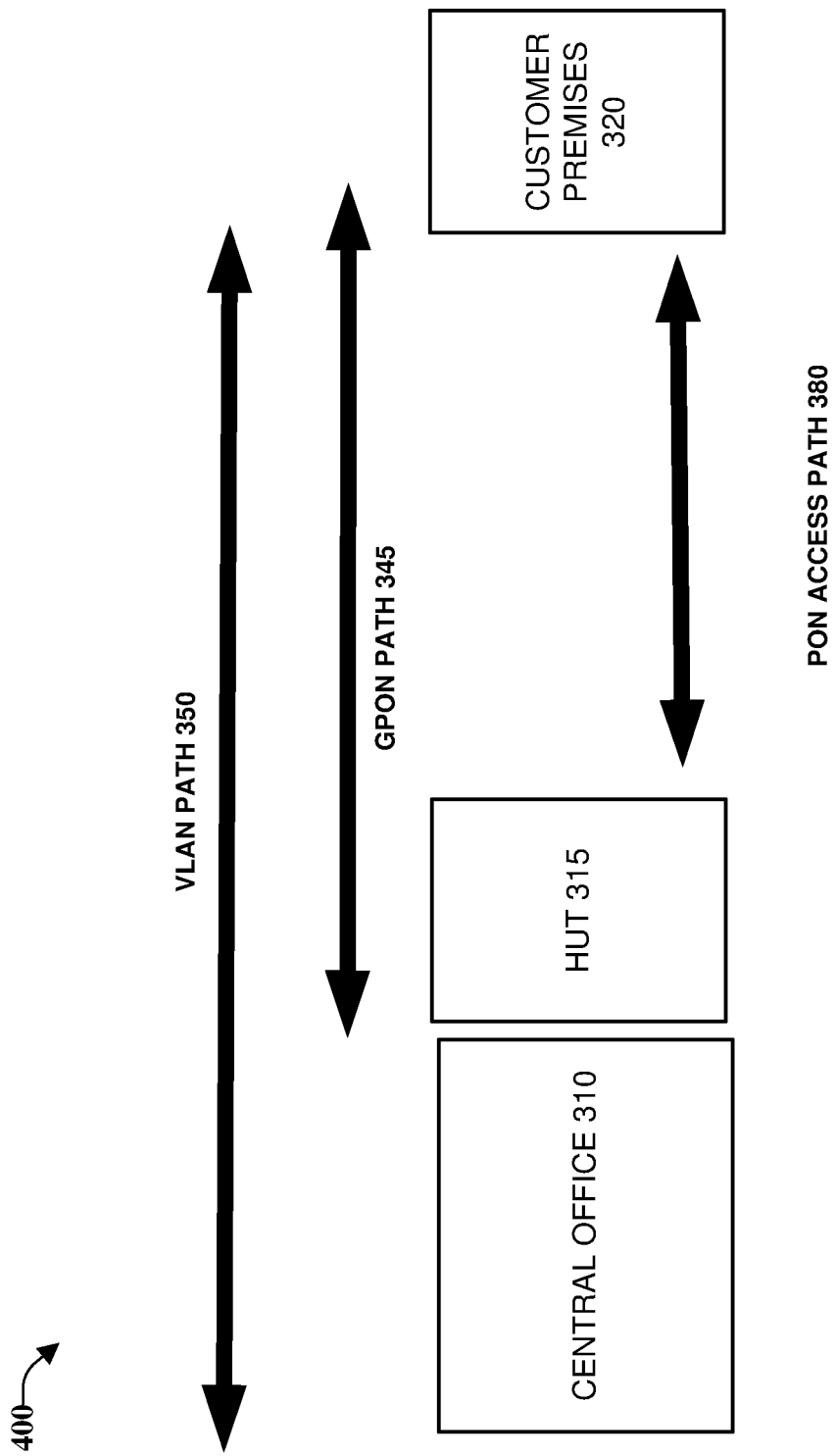
FIG. 4 is an architecture diagram of an example system that can facilitate generating and utilizing templates to deploy network equipment, in accordance with one or more embodiments.

FIG. 4 is an architecture diagram of an example system 400 that can facilitate generating and utilizing logical resource paths, in accordance with one or more embodiments. For purposes of brevity, description of like elements and/or processes employed in other embodiments is omitted.

As depicted, system 400 includes customer premises 320, hut 315, and central office 310, along with logical resource paths including VLAN path 350, GPON path 345, and PON access path 380.

In one or more embodiments, logical and physical connections discussed with FIG. 3 above can be modeled generically as a path (or link, or connection) resource, e.g., also termed link resource or connection resource. To facilitate flexible implementation of the path resources, different elements of a path resource can be by one or more embodiments. For example, path resources can be configured by elements including, but not limited to, native parameters (e.g., parameters that directly define the path itself), connection elements (e.g., list of child paths that are comprised in a logical path), and the set of endpoints for the path, e.g., elements specifying where the path begins and ends. With these three elements, one or more embodiments can model a variety of different physical and logical circuit hierarchies for different network equipment configurations.

In an example where customer premises 320 is to be connected to the Internet, logical circuits VLAN path 350, GPON path 345, and PON access path 380 can be selected by one or more embodiments to facilitate completion of the connection. Native parameters for PON access path 380 can include port configuration for a newly deployed ONT 322 and existing FST 370 component, with these parameters being set by different processes, including discovery of existing parameters for other components (e.g., port configuration of ONT 322 can be based on existing settings for FST 370), historical data from past, similar deployments, and other approaches.

Continuing this example, as noted above, this customer fulfillment project includes VLAN path 350, GPON path 345, and PON access path 380, and connection elements for these paths include references to other link resources within a path hierarchy, e.g., PON access path 380 is a child path of GPON path 345, with this hierarchy being used by one or more embodiments to determine sequential or parallel use of different logical paths. Other elements that can be used to configure the link resources include endpoints for the utilized paths, e.g., ONT 322 being an example endpoint for fiber drop 323 connection from FST 370. With respect to an example relationship between connection elements and endpoints, it should be noted that in some embodiments, paths may not have end-points and just have child paths (e.g., VLAN path 350), some embodiments may have end-points and no child paths (e.g., PON access path), or they might have both, e.g., GPON path 345, in some implementations has both endpoints and child paths.

It should be noted that one or more embodiments can automatically generate the logical paths described above by analyzing both the requirements for a particular project, and the configuration of existing elements of the system. In an example, as discussed above, when a project request is received by one or more embodiments, one or more logical paths can be selected for the provisioning, configuration and deployment of different network equipment. In a variation of this example, in some circumstances, collections of existing paths may not exist for a particular project.

When resource paths are unavailable for a particular set of connections, one or more embodiments can generate the resource paths either with new settings or by modifying existing resource paths. Thus, in an example, when new resource equipment is sought to be included within a connection path (e.g., updated technology for fiber drop 323 and FST 370), one or more embodiments can modify GPON path 345 and PON access path 380 to incorporate the new elements.

In other aspects of embodiments, hierarchy data for different network equipment and resource paths are determined, this complex hierarchy information can be transformed for display on a graphical user interface (GUI). In an example implementation, child and end-point relations are provided, but the exact placement on a GUI can benefit from proper spacing and placement of different segments, ports, and network equipment. One or more embodiments can use the following approaches to transform configuration data into a GUI.

In this approach, a grid is defined on the GUI, and a traversal begins on the root level and recursively flows down to each child until an element is reached that has no child elements. At each level, a row number can be assigned (e.g., being incremented as the descendent tree is traversed). In a non-limiting example, in the system depicted in FIG. 3, VLAN path 350 can be assigned a row 0, and when a child element is identified (e.g., GPON path 345 and ethernet access path 330) these can be assigned row 1, with subsequent children being assigned incrementally larger row numbers, e.g., PON network path 340 and PON access path assigned with row 2.

Continuing this approach, when placing elements in the GUI, a first child can be placed at the left edge of its parent element, with the child passing its left edge to its first child, and so on. At the last level (e.g., no child elements), the child will return to placement at its left location. Continuing this description, once a parent receives a response from its first child (assuming other children), one or more embodiments can add the width of the child to the left column of the child and use that as the "left" of the second child. In one or more embodiments, if one of the child elements has been assigned a "left" position (e.g., through a position attribute), then its "left" is the maximum of the parent's "left" and the assigned "left" and it will pass that to its parent, e.g., based on this approach, items can be shifted to the right if some elements have fixed positioning, thereby preventing overlap in certain cases. In another feature of one or more embodiments, when two connection elements have ports on the same device, then the assigned row can be incremented to be equal with the largest row. In some implementations, this can beneficially result in GUI placement of devices (e.g., ONT 322 that can have links on each end) at the same row as other circuits on each end.

Figure 5:
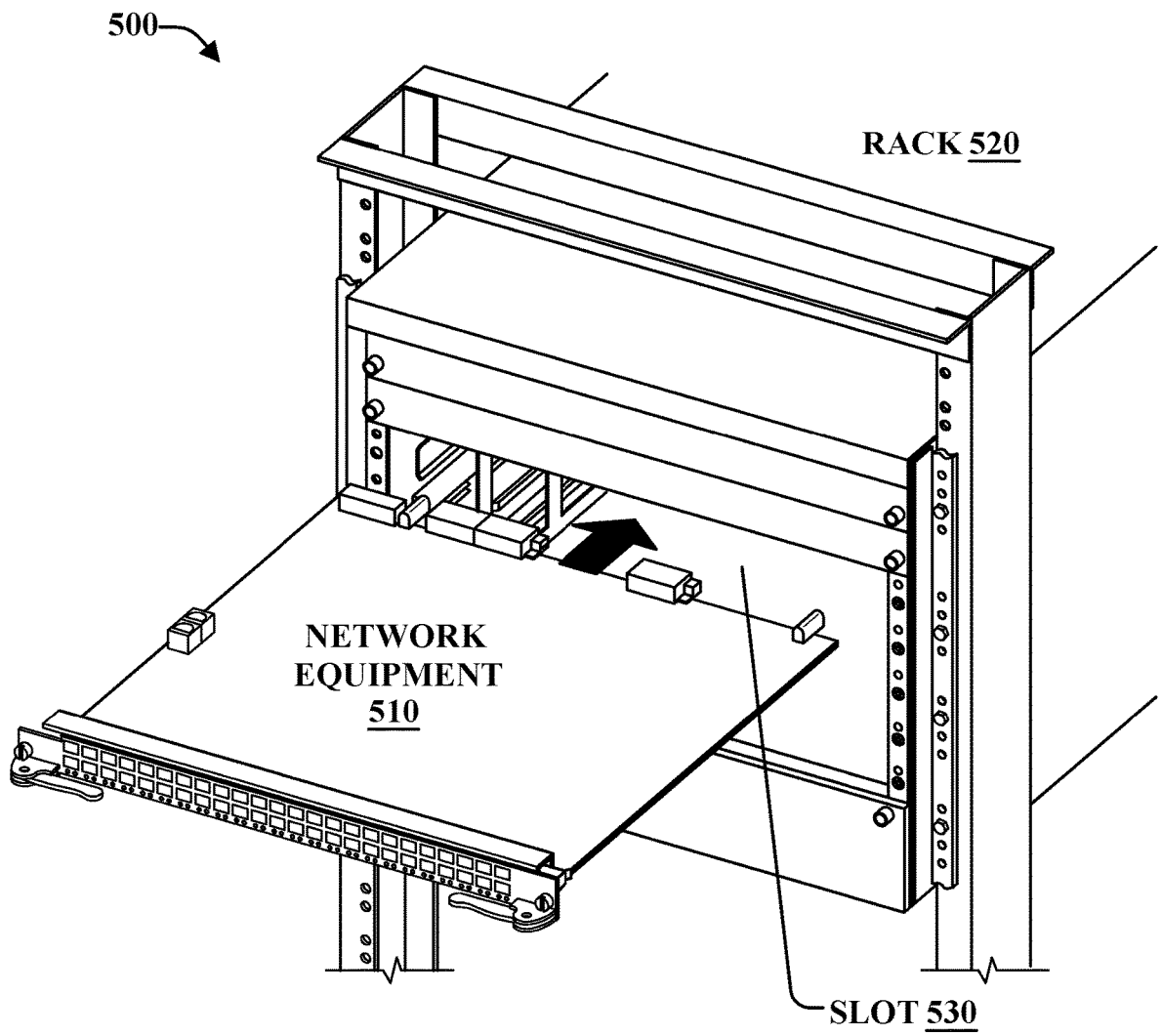
FIG. 5 is a diagram of an example system 500 that illustrates deploying network equipment at a geographic location having rack-mounting capacity for network equipment, in accordance with one or more embodiments.

FIG. 5 is a diagram of an example system 500 that illustrates deploying network equipment at a geographic location having rack-mounting capacity for network equipment, in accordance with one or more embodiments. For purposes of brevity, description of like elements and/or processes employed in other embodiments is omitted. System 500 can include rack 520 with slot 530 that can receive and mount network equipment 510.

As depicted in FIG. 5, in additional or alternate embodiments, deployment template 177 can include a location characteristic, and deploying network equipment 510 can further be based on the location characteristic based on the deployment location. In the example depicted, deploying network equipment 510 can further be based on the location characteristic, e.g., the location characteristic including a rack-mounting characteristic applicable to rack 520 associated with mounting of network equipment 510 in slot 530. In a non-limiting example, network equipment 510 can be mounted without configuration of operation or connection with other network equipment, and one or more embodiments can discover the network equipment, analyze the specifics characteristics of the hardware, and deployment requirements. Based on this discovery, as described herein, a deployment template 177 can be selected and network equipment 510 can be configured for operation and connection with other network equipment.

Figure 6:
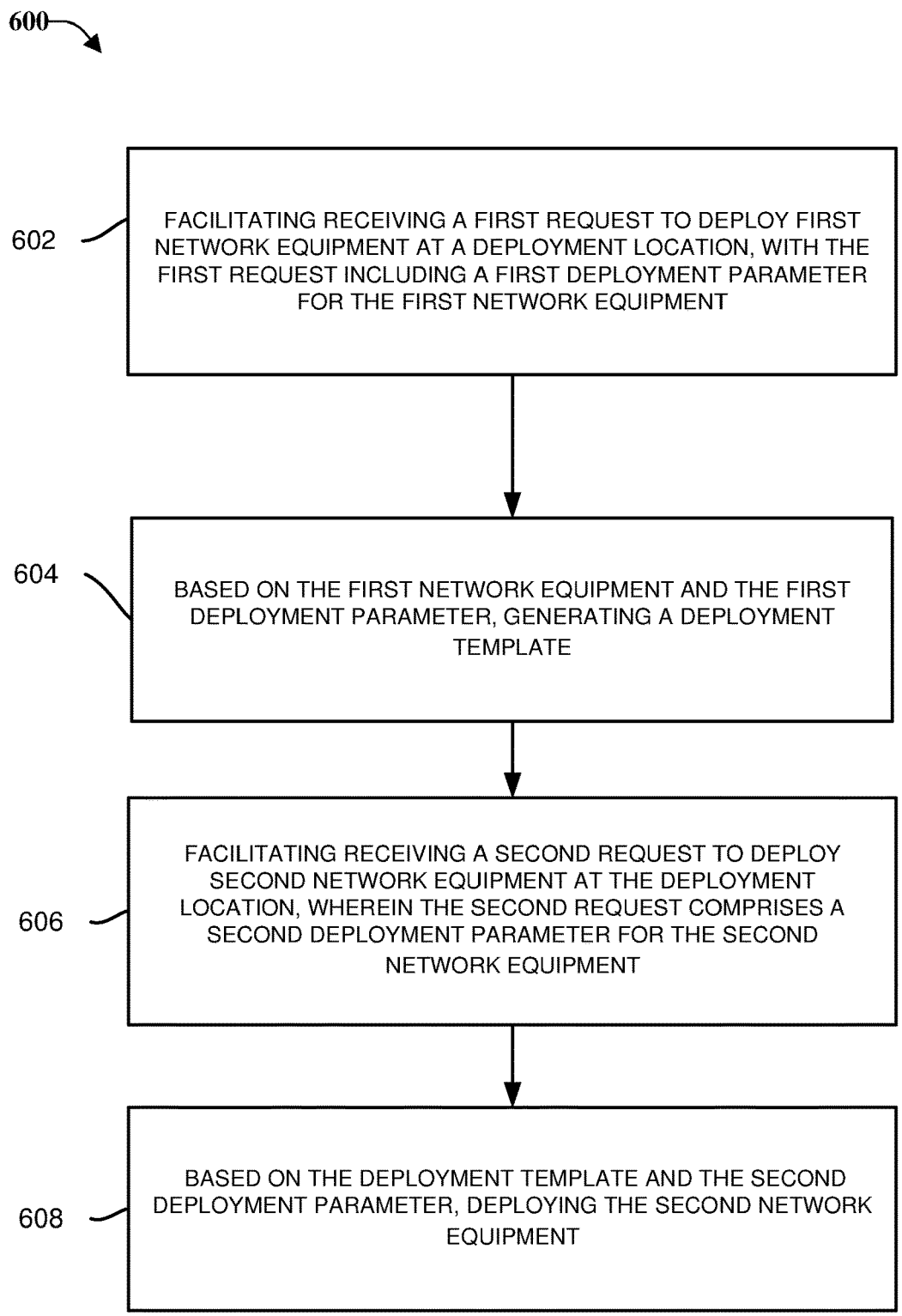
FIG. 6 is a diagram of a non-limiting example method that can facilitate generating and utilizing templates to deploy network equipment, in accordance with one or more embodiments.

FIG. 6 is a diagram of a non-limiting example method 600 that can facilitate generating and utilizing templates to deploy network equipment, in accordance with one or more embodiments. For purposes of brevity, description of like elements and/or processes employed in other embodiments is omitted.

It should be noted that, in one or more embodiments, system 100 and other embodiments described herein can employ hardware and/or software to solve problems that are highly technical in nature, including modeling complex hardware and software deployments. One having skill in the relevant art(s), given the disclosure herein, would appreciate that the technical problems that can be solved by one or more embodiments described herein are not abstract and cannot be performed as a set of mental acts by a human, e.g., in some circumstances updating complex templates for the deployment of network equipment.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to timing the performance of change procedures for systems where system functions are implemented with different redundant safeguards. System 100 and/or components of the system can be employed to use method 600 and other embodiments to solve new problems that arise through advancements in technologies mentioned above, computer architecture, and/or the like.

At 602, method 600 can include facilitating receiving a first request to deploy first network equipment at a deployment location, with the first request including a first deployment parameter for the first network equipment. At 604, method 600 can include, based on the first network equipment and the first deployment parameter, generating a deployment template. At 606, method 600 can include facilitating receiving a second request to deploy second network equipment at the deployment location, wherein the second request comprises a second deployment parameter for the second network equipment. At 608, method 600 can include, based on deployment template 177 and the second deployment parameter, deploying the second network equipment.

Figure 7:
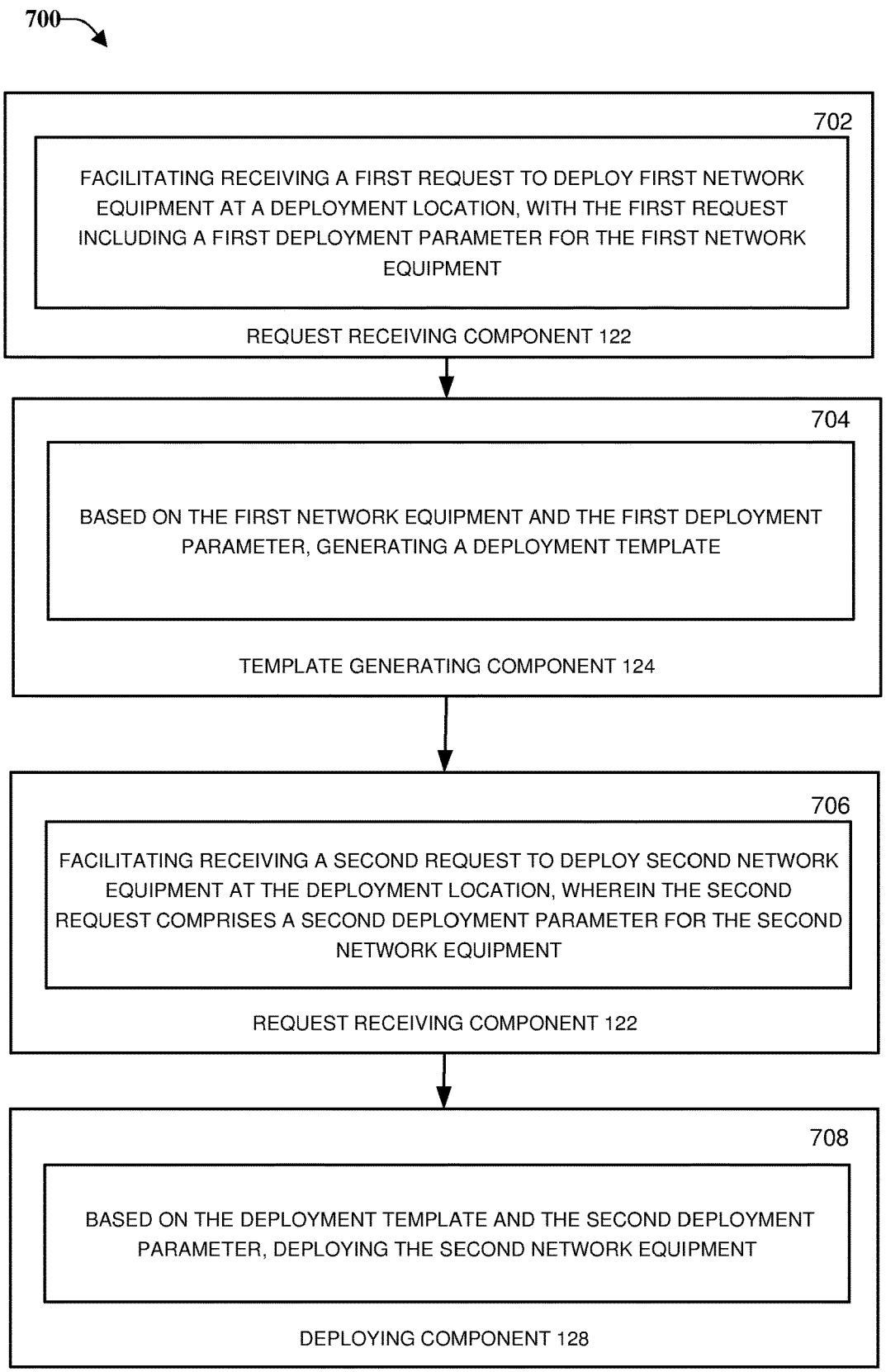
FIG. 7 depicts a system where one or more functions of configuration equipment can be implemented to facilitate generating and utilizing templates to deploy network equipment, in accordance with one or more embodiments.

FIG. 7 depicts a system 700 where one or more functions of configuration equipment 150 described above can be implemented, in accordance with one or more embodiments described above to facilitate generating and utilizing templates to deploy network equipment. For purposes of brevity, description of like elements and/or processes employed in other embodiments is omitted.

In one or more embodiments, configuration equipment 150 can be implemented in a software platform that includes several interconnected components. As depicted, system 700 can include request receiving component 122, template generating component 124, template selecting component 126, deploying component 128, and other components described or suggested by different embodiments described herein.

In an example, component 702 can include the functions of request receiving component 122, supported by the other layers of system 700. For example, component 702 can facilitate receiving a first request to deploy first network equipment at a deployment location, with the first request including a first deployment parameter for the first network equipment. Continuing this example, component 704 can include the functions of template generating component 124, supported by the other layers of system 700. For example, component 704 can based on the first network equipment and the first deployment parameter, generate a deployment template.

Further, component 706 can include the functions of request receiving component 122, supported by the other layers of system 700. For example, component 706 can facilitate receiving a second request to deploy second network equipment at the deployment location, with the second request including a second deployment parameter for the second network equipment. Component 708 can include the functions of deploying component 128, supported by the other layers of system 700. For example, component 708 can, based on deployment template 177 and the second deployment parameter, deploy the second network equipment.

Figure 8:
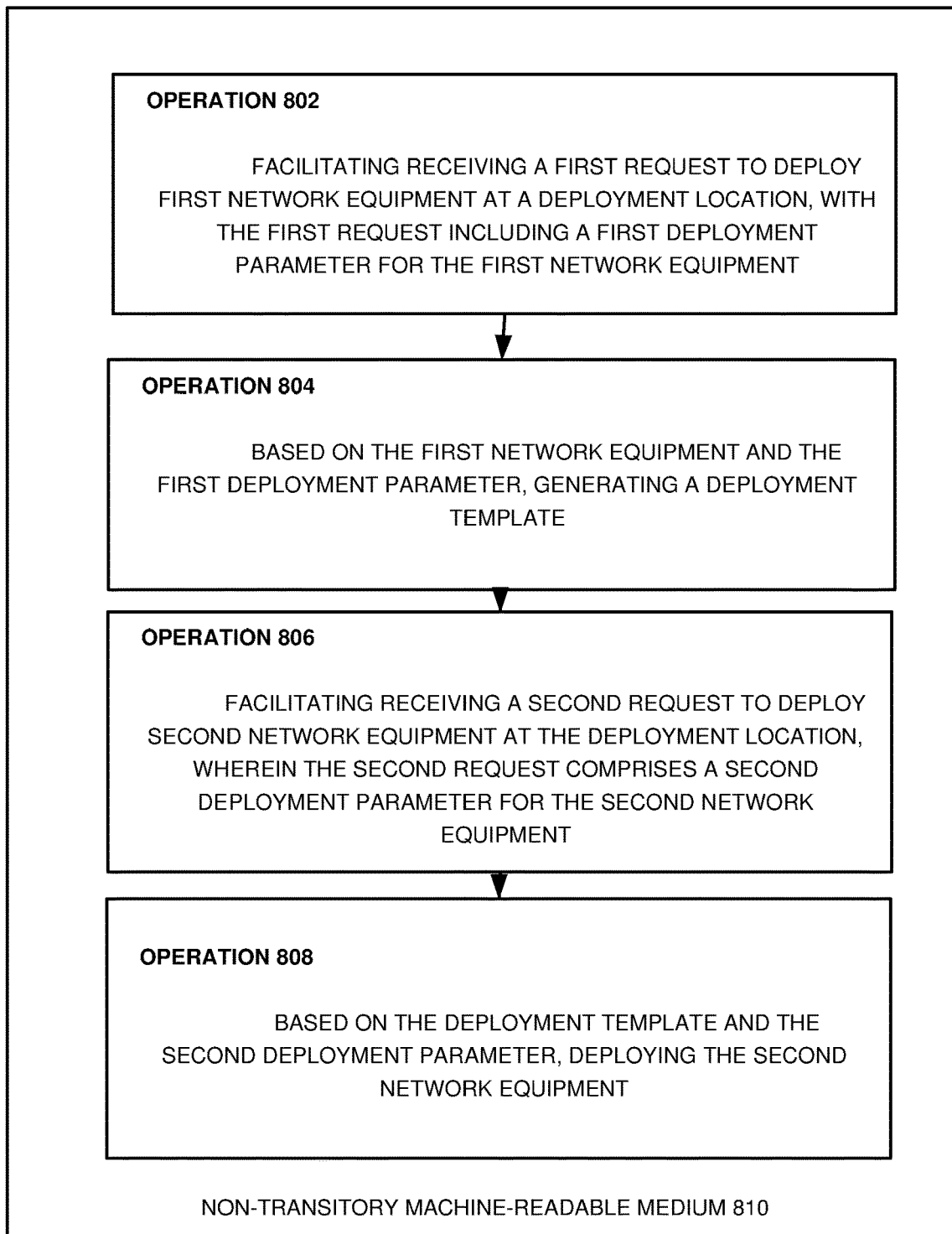
FIG. 8 depicts an example non-transitory machine-readable medium that can include executable instructions that, when executed by a processor of a system, facilitate provisioning network equipment based on logical and physical modeling, in accordance with one or more embodiments.

FIG. 8 depicts an example 800 non-transitory machine-readable medium 810 that can include executable instructions that, when executed by a processor of a system, facilitate generating and utilizing templates to deploy network equipment, in accordance with one or more embodiments described above. For purposes of brevity, description of like elements and/or processes employed in other embodiments is omitted.

As depicted, non-transitory machine-readable medium 810 includes executable instructions that can facilitate performance of operations 802-806. In one or more embodiments, the operations can include operation 802 that can facilitate receiving a first request to deploy first network equipment at a deployment location, with the first request including a first deployment parameter for the first network equipment. Operation 804 can, based on the first network equipment and the first deployment parameter, generate a deployment template. Operation 806 can facilitate receiving a second request to deploy second network equipment at the deployment location, wherein the second request comprises a second deployment parameter for the second network equipment. Operation 808 can, based on deployment template 177 and the second deployment parameter, deploy the second network equipment.

Figure 9:
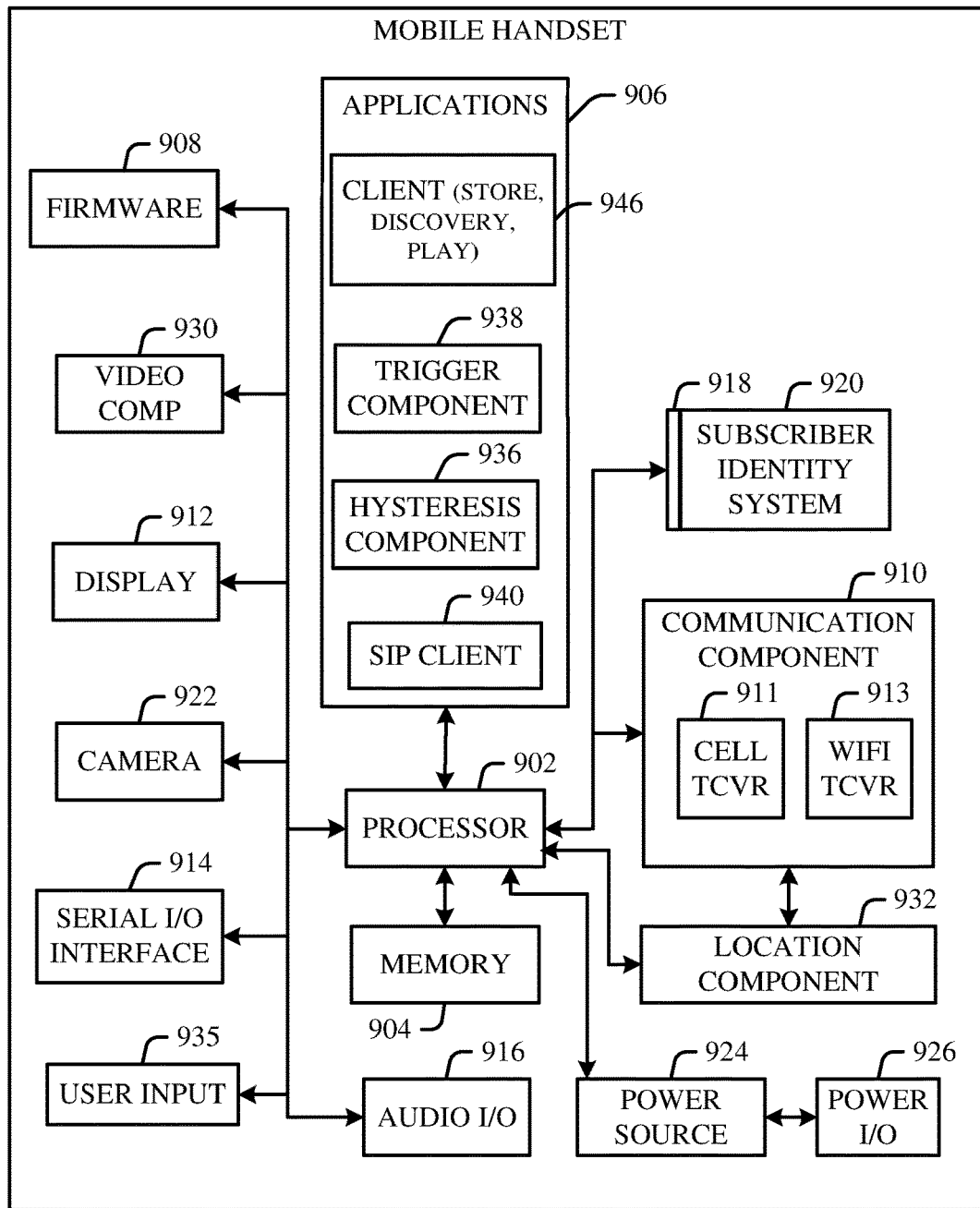
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 913 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
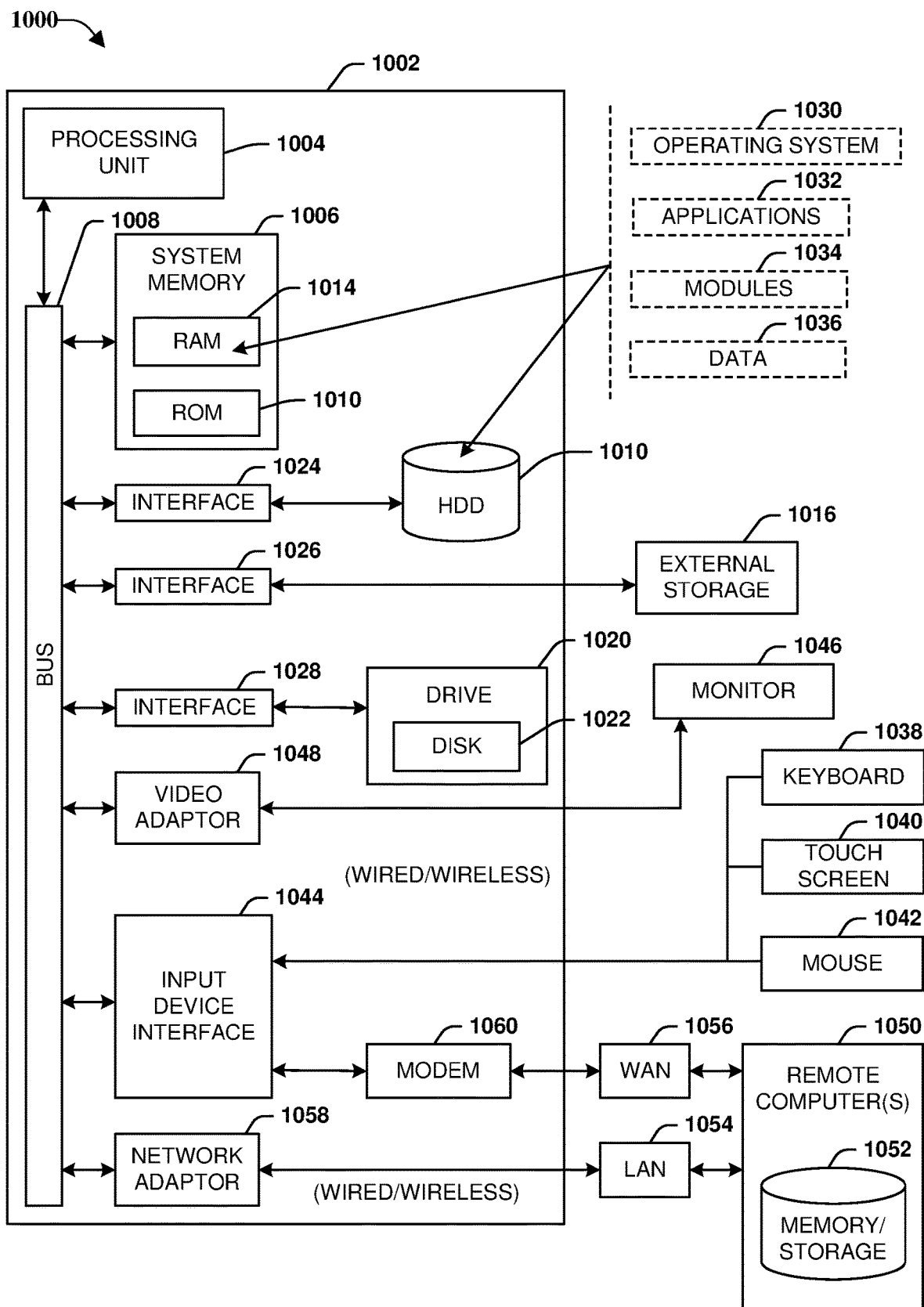
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

FIG. 10 depicts an example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1014 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB), ROM base address (RBA), and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH¬Æ interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH¬Æ wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE) or 5G; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. Broadband equipment, comprising:
a processor; and
a memory that stores executable instructions that, when executed by the processor, facilitate performance of operations, the operations comprising:
configuring a characteristic of the broadband equipment, resulting in a configured characteristic, wherein the broadband equipment is deployed at a geographic location based on a template selected based on the geographic location and the broadband equipment, and wherein the configured characteristic comprises an IP address, a Virtual LAN, an interface that is used, a port that is allocated, or any combination thereof; and
based on the configured characteristic, sending an indication to deployment equipment that the template has been validated, wherein, based on the indication, the template is subsequently selected for deployment of other broadband equipment identified based on a similarity to the template, wherein the other broadband equipment is other than the broadband equipment.

2. The broadband equipment of claim 1, wherein the broadband equipment is configured to enable connectivity between central office fiber equipment and an internet network connection.

3. The broadband equipment of claim 1, wherein the template comprises a lifecycle characteristic, and wherein the deployment of the other broadband equipment is based on the lifecycle characteristic and a lifecycle status of the other broadband equipment.

4. The broadband equipment of claim 1, wherein the other broadband equipment is selected for the deployment at the geographic location, wherein the template comprises a location characteristic based on the geographic location, and wherein the deployment of the other broadband equipment is based on the location characteristic.

5. The broadband equipment of claim 4, wherein the location characteristic comprises a mounting characteristic of the geographic location, and wherein the mounting characteristic comprises a rack-mounting characteristic applicable to a rack associated with mounting of the broadband equipment.

6. The broadband equipment of claim 5, wherein the rack-mounting characteristic comprises a mounting slot in the rack at the geographic location.

7. The broadband equipment of claim 1, wherein the template comprises a logical resource path that describes a link between the broadband equipment and the other broadband equipment.

8. A method, comprising:
facilitating, by first network equipment comprising a processor, configuring of a characteristic of the first network equipment, resulting in a configured characteristic, wherein the first network equipment is deployed at a deployment location based on a deployment template selected based on the first network equipment, and wherein the configured characteristic comprises an IP address, a Virtual LAN, an interface that is used, a port that is allocated, or any combination thereof; and
based on the configured characteristic, validating, by the first network equipment, the deployment template, wherein, based on the validating, the deployment template is subsequently selected for deployment of second network equipment.

9. The method of claim 8, wherein the second network equipment is deployed at the deployment location, and wherein the deployment template is selected for the deployment of the second network equipment further based on the second network equipment being deployed at the deployment location.

10. The method of claim 8, wherein the deployment template is selected by:
evaluating the second network equipment compared to characteristics of the deployment template, and
based on a result of the evaluating, selecting the deployment template for the deploying of the second network equipment.

11. The method of claim 8, wherein the deployment template comprises a lifecycle characteristic, and wherein the deploying of the first network equipment was further based on the lifecycle characteristic and a lifecycle status of the first network equipment.

12. The method of claim 8, wherein the deployment template comprises a location characteristic based on the deployment location, and wherein the deploying of the first network equipment was further based on the location characteristic.

13. The method of claim 12, wherein the location characteristic comprises a mounting characteristic of the deployment location, and wherein the mounting characteristic comprises a rack-mounting characteristic applicable to a rack associated with mounting of the first network equipment.

14. The method of claim 13, wherein the rack-mounting characteristic comprises a mounting slot in the rack at the deployment location.

15. The method of claim 8, wherein the deployment template comprises a logical resource path that describes a link between the first network equipment and the second network equipment.

16. The method of claim 15, wherein the deploying of the second network equipment based on the deployment template comprises deploying the link between the first network equipment and the second network equipment based on the logical resource path.

17. The method of claim 16, wherein the deploying of the link based on the logical resource path comprises:
transforming the logical resource path into a physical resource path; and
deploying the link based on the physical resource path.

18. A non-transitory machine-readable medium, comprising executable instructions that, when executed by a processor of a first network device, facilitate performance of operations, the operations comprising:
configuring a characteristic of a first network device, resulting in a configured characteristic, wherein the first network device is deployed at a deployment location based on a deployment template selected based on the first network device, wherein the configured characteristic comprises an IP address, a Virtual LAN, an interface that is used, a port that is allocated, or any combination thereof; and
based on the configured characteristic, validating the deployment template, wherein, based on the validating, the deployment template is subsequently selected for deployment of a second network device.

19. The non-transitory machine-readable medium of claim 18, wherein the second network device is deployed at the deployment location, and wherein the deployment template is selected for the deployment of the second network device further based on the second network device being deployed at the deployment location.

20. The non-transitory machine-readable medium of claim 18, wherein the deployment template comprises a lifecycle characteristic, and wherein the deploying of the first network device was further based on the lifecycle characteristic and a lifecycle status of the first network device.

* * * * *